United States Patent
White et al.

(10) Patent No.: US 8,649,426 B2
(45) Date of Patent: Feb. 11, 2014

(54) LOW LATENCY HIGH RESOLUTION VIDEO ENCODING

(75) Inventors: Patrick White, Renfrew (CA); Mojtaba Hosseini, Ottawa (CA)

(73) Assignee: Magor Communications Corporation, Ottawa, ON (CA)

( * ) Notice: Subject to any disclaimer, the term of this patent is extended or adjusted under 35 U.S.C. 154(b) by 1238 days.

(21) Appl. No.: 12/232,496

(22) Filed: Sep. 18, 2008

(65) Prior Publication Data

US 2010/0067571 A1    Mar. 18, 2010

(51) Int. Cl.
- H04N 7/12    (2006.01)
- H04N 11/02    (2006.01)
- H04N 11/04    (2006.01)

(52) U.S. Cl.
USPC ........................... 375/240.01; 386/200

(58) Field of Classification Search
USPC ................................... 375/240.01
See application file for complete search history.

(56) References Cited

U.S. PATENT DOCUMENTS

| | | | |
|---|---|---|---|
| 5,057,916 A | 10/1991 | Krause et al. | |
| 5,430,486 A | 7/1995 | Fraser et al. | |
| 5,809,176 A * | 9/1998 | Yajima | 382/247 |
| 2001/0026677 A1 | 10/2001 | Chen et al. | |
| 2002/0114525 A1 | 8/2002 | Bolle et al. | |
| 2005/0201471 A1 | 9/2005 | Hannuksela et al. | |
| 2006/0161676 A1 * | 7/2006 | Hong et al. | 709/231 |
| 2006/0239343 A1 * | 10/2006 | Mohsenian | 375/240.01 |
| 2008/0152014 A1 * | 6/2008 | Schreier et al. | 375/240.21 |

FOREIGN PATENT DOCUMENTS

| | | | | |
|---|---|---|---|---|
| CA | 2483293 | | 11/2003 | |
| EP | 12276684 A2 * | | 7/2002 | H04N 7/26 |

OTHER PUBLICATIONS

Lili Zhao et al. "A Dynamic Slice Control Scheme for Slice-Parallel Video Encoding." 19th IEEE International Conference on Image Processing (ICIP), pp. 713-716 (2012).*

ISA/CA, "International Search Report", dated Dec. 16, 2009, pp. 1 to 3.

* cited by examiner

*Primary Examiner* — Taghi Arani
*Assistant Examiner* — Narciso Victoria
(74) *Attorney, Agent, or Firm* — Marks & Clerk; Richard J. Mitchell

(57) ABSTRACT

Video data that is associated with a videoconference or a telepresence session is captured and a video signal relating thereto is provided. The video signal is divided into segments, which are identical from one video frame to another subsequent video frame within the video signal. Each segment is encoded independently, to result in encoded segment data such that both I-frames and P-frames are generated for a given segment, so as to support independent reconstruction of segments at a distant end. The encoded segment data is transmitted subsequently to the distant end.

13 Claims, 4 Drawing Sheets

◪ Segment 0
▨ Segment 1
◪ Segment 2
▥ Segment 3

LOW LATENCY HIGH RESOLUTION VIDEO ENCODING

FIELD OF THE INVENTION

The invention relates generally to videoconferencing and more particularly to low-latency high-resolution videoconferencing and telepresence applications.

BACKGROUND OF THE INVENTION

Throughout history various systems have been employed for communicating messages over short distances. Optical telegraphs such as for instance smoke signals, beacons and semephore networks date back to ancient times. Of course, such systems require a direct line of sight between the communicating parties and are effective only over relatively short distances. With the emergence of the electrical telegraph in the 1800's the transmission of communication signals between two parties, even over great distances, became far more practical and cost effective. More recently, with the development of two-way radio communication systems and analog or digital telephone networks, it has become more-or-less a routine matter to communicate with one or more parties that are located virtually anywhere in the world.

Unfortunately, most current systems that support communication over large distances are somewhat limited in that they do not include a visual-communication component. This results in the disadvantage that visual cues including body language, facial expressions and gestures are not conveyed between the communicating parties. Such visual cues are an important and often unconcious aspect of communication between humans. Without these familiar visual cues it is more difficult for one to interpret accurately another person's reactions, moods and sincerity.

This limitation is well recognized, and since at least the 1960's there has been an ongoing effort to develop practical ways of including a visual-communication component in addition to audio communication between parties. In fact, this goal has been achieved, with varying degrees of success, using videoconferencing technology and videophones. A videoconference is a set of interactive telecommunication technologies which allow two or more locations to interact via two-way simultaneous video and audio transmissions. The core technology used in a videoconference system is digital compression of audio and video streams in real time. The other components of a videoconference system include: video input i.e. a video camera or webcam; video output i.e. a computer monitor, television or projector; audio input i.e. microphones; audio output i.e. usually loudspeakers associated with the display device or telephone; data transfer i.e. analog or digital telephone network, LAN or Internet.

Simple analog videoconferences could be established as early as the invention of the television. Such videoconferencing systems consisted of two closed-circuit television systems connected via cable, radiofrequency links, or mobile links. Attempts at using normal telephony networks to transmit slow-scan video, such as the first systems developed by AT&T, failed mostly due to the poor picture quality and the lack of efficient video compression techniques. It was only in the 1980s that digital telephony transmission networks became possible, such as ISDN, assuring a minimum bit rate (usually 128 kilobits/s) for compressed video and audio transmission. Finally, in the 1990s, IP (Internet Protocol) based videoconferencing became possible, and more efficient video compression technologies were developed, permitting desktop, or personal computer (PC)-based videoconferencing.

It is worth noting at this point that businesses and individuals have been slow to adopt IP-based videoconferencing despite the many advantages, even as high-speed Internet service has become more widely available at a reasonable cost. This failure is due at least in part to the typically uncomfortable experience that is associated with IP-based videoconferencing. In particular, often the video component is of poor quality and "choppy" or not precisely synchronized with the audio component of the communication. Rather than enhancing communication, the video component may actually provide false visual cues and even disorient or nauseate those that are party to the communication. Of course, wider adoption is likely to occur when the video-component is improved sufficiently to provide more natural motion and life-like representation of the communicating parties. Accordingly, each incremental improvement in the encoding and transmission of video data is an important step toward achieving widespread adoption of videoconferencing.

A more recent development, which is related closely to videoconferencing, is telepresence. Telepresence refers to a set of technologies which allow a person to feel as if they were present, to give the appearance that they were present, or to have an effect, at a location other than their true location. A good telepresence strategy puts the human factors first, focusing on visual collaboration solutions that closely replicate the brain's innate preferences for interpersonal communications, separating from the unnatural "talking heads" experience of traditional videoconferencing. These cues include life-size participants, fluid motion, accurate flesh tones and the appearance of true eye contact. In many telepresence applications there is an implicit requirement for high-resolution video content.

A major obstacle to the widespread adoption of videoconferencing and telepresence is the need to transmit consistently and in real time a large amount of video data between two or more remote locations via a communications network. As a result, video encoding techniques are used to reduce the amount of video data that are transmitted. For instance, MPEG algorithms compress data to form small data sets that can be transmitted easily and then decompressed. MPEG achieves its high compression rate by representing only the changes from one frame to another, instead of each entire frame. The video information is then encoded using a technique called Discrete Cosine Transform (DCT). For example, in a scene in which a person walks past a stationary background, only the moving region will need to be represented, either using motion compensation or as refreshed image data or as a combination of the two, depending on which representation requires fewer bits to adequately represent the picture. The parts of the scene that are not changing need not be sent repeatedly. MPEG uses a type of lossy compression, since some data is removed, but the diminishment of data is generally imperceptible to the human eye.

The three major picture—or frame—types found in typical video compression designs are Intra coded pictures (I-frames), Predicted pictures (P-frames), and Bi-predictive pictures (B-frames). However, for a real-time video communication only Intra (I-frames) and Predictive (P-frames) are considered. In a motion sequence, individual frames of pictures are grouped together (called a group of pictures, or GOP) and played back so that the viewer registers the video's spatial motion. Also called a keyframe, an I-frame is a single frame of digital content that the encoder examines independent of the frames that precede it; the I-frame stores all of the data needed to display that frame. Typically, I-frames are interspersed with P-frames in a compressed video. The more I-frames that are contained, the better quality the video will be; however, I-frames contain the most amount of data and therefore increase network traffic load. P-frames follow I-frames and contain only the data that have changed from the preceding I-frame (such as color or content changes). Because of this, P-frames depend on the I-frames to fill in most of the data. In essence, each frame of video is analyzed to determine regions with motion and regions that are static. When P-frames are sent, they contain data that has changed for the entire frame. Similarly, each I-frame contains data for the entire frame. Thus, both the peak and average network load is relatively high.

Modern video encoding techniques work extremely well, and are capable of achieving compression ratios in the range of 200:1 to 500:1. Unfortunately, this type of encoding is computationally very expensive and requires extremely powerful processing capabilities at the transmitting end. Dedicated videoconferencing and telepresence systems, which are cost prohibitive in most instances, do have sufficient processing capabilities and are effective for encoding high resolution video in real time. On the other hand, PC-based videoconferencing systems seldom have sufficient processing capabilities to handle video encoding operations in real time. For instance, using a modern computer with four 2-GHz cpu cores to encode high resolution video (1920×1080 pixel at 30 fps) introduces an unacceptable latency of 200 ms. Of note, the processing power that is required to decode the encoded video at the receiving end is considerably less.

Another problem that is associated with modern video encoding techniques is the high peak/average data bursts caused by sending the I-frame via the communication network. Data bursts occur initially when the videoconference begins and also at intervals throughout the videoconference. The increased network traffic can result in delays in receiving the I-frame data at the receiving end, leading to choppy video and/or packet loss. Decreasing the frequency of I-frame transmission does not decrease the peak data burst issues, and additionally degrades video quality.

It would be advantageous to provide a method and system that overcomes at least some of the above-mentioned limitations of the prior art.

SUMMARY OF EMBODIMENTS OF THE INVENTION

According to an aspect of the instant invention there is provided a method for encoding in real time a video signal that is associated with one of a videoconference and a telepresence session, the method comprising: capturing video data and providing video signal data in dependence thereon; separating the video signal data into segments, the segments identical from one video frame to another subsequent video frame within a same video signal data; encoding each segment independently to result in encoded segment data such that both I-frames and P-frames are generated for a given segment and allowing for independent reconstruction of segments at a distant end; and, transmitting the encoded segment data.

According to an aspect of the instant invention there is provided a method for encoding in real time a video signal that is associated with one of a videoconference and a telepresence session, the method comprising: capturing a sequence of video frame data, the sequence of video frame data comprising at least a portion of the video signal; dividing each frame into a plurality of segments; encoding the segments independently of one another and at least some of the segments encoded in parallel with encoding other of the segments; and, transmitting via a communications network the encoded segments, such that transmission of some segments is offset in time from transmission of other segments.

According to an aspect of the instant invention there is provided a method for encoding in real time a video signal that is associated with one of a videoconference and a telepresence session, the method comprising: capturing a sequence of video frame data, the sequence of video frame data comprising at least a portion of the video signal; dividing each frame into a plurality of segments comprising a first segment that contains at least a threshold amount of motion during the session and including a second segment that contains less then the threshold amount of motion during the session; encoding the first segment and encoding independently the second segment, such that both I-frames and P-frames are generated for each of the first and second segment; transmitting via a communications network the I-frame relating to the first segment and after a delay sufficient for reducing the data burst rate transmitting via the communications network the I-frame relating to the second segment, so as to transmit the first and second segments in a fashion for reducing the data burst rate resulting therefrom.

According to an aspect of the instant invention there is provided a video encoding system for encoding in real time a video signal that is associated with one of a videoconference and a telepresence session, the system comprising: a port for receiving a video signal comprising frame data, the frame data divisible into a plurality of different predetermined segments; a plurality of video encoders each one for encoding independently a different one of the predetermined segments; and, a transceiver for providing encoded segments onto a network.

BRIEF DESCRIPTION OF THE DRAWINGS

Exemplary embodiments of the invention will now be described in conjunction with the following drawings, in which.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1:
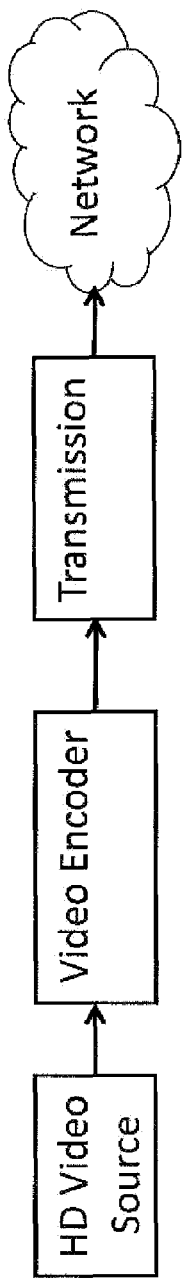
FIG. 1 is a simplified flow diagram showing prior art video encoding.

Referring to FIG. 1, shown is a simplified flow diagram for encoding high-resolution video according to the prior art. Raw high-resolution video signal is provided from a HD (High Definition) video source to a video encoder. The video encoder then encodes the video signal according to a predetermined encoding technique. The encoded video signal is provided to a transmitter for transmission via the network. As is shown in FIG. 1, in the prior art approach to high-resolution video encoding and transmission the entire high-resolution frame is processed by the encoder and passed to the network for transmission. The delay between capture and the end of encoding of an entire frame can be significant for a high-resolution frame, such as for instance on the order of 100s of milliseconds.

Figure 2:
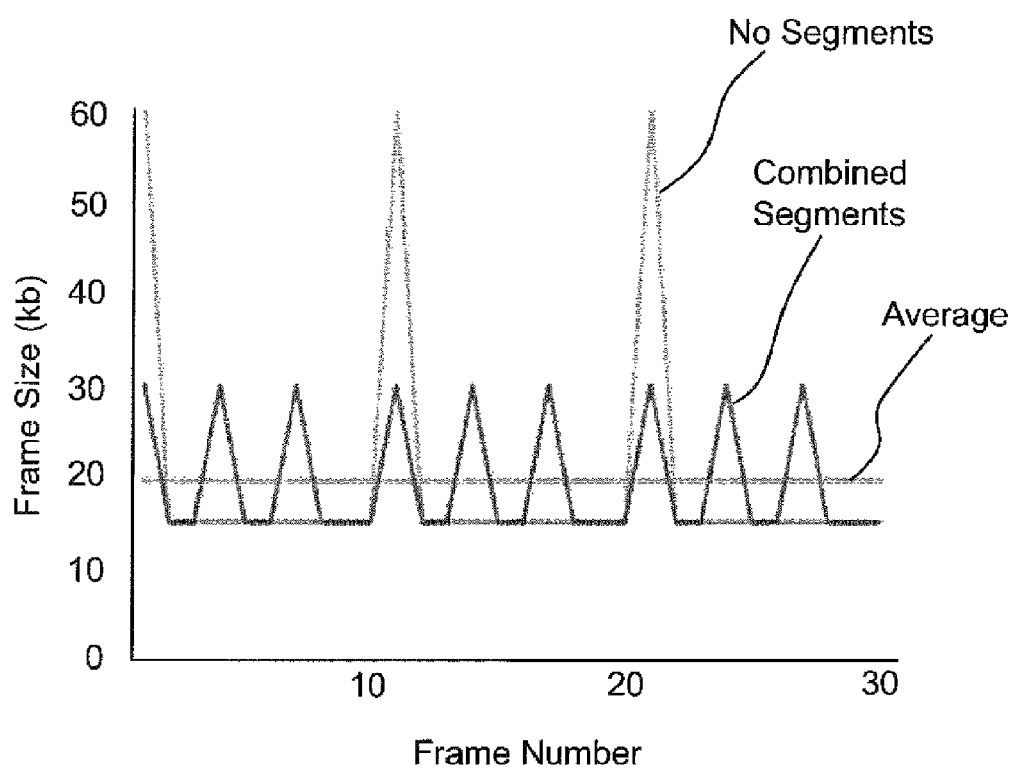
FIG. 2 is a plot showing frame size vs. frame number for prior art video encoding.

Referring now to FIG. 2, it is apparent that for the prior art approach to video encoding the peak to average bit rate ratio of the video bitstream is very high, due to large I-frames, which causes large bursts of traffic on the network and often results in packet loss. Peak data bursts, shown at 21 occur periodically as I-frames are transmitted at frame intervals. The average bit rate 22 is shown as a horizontal line. Though the average bit rate 22 is relatively low, it would take the entire time between one databurst 21a and a subsequent databurst 21b for all of the databurst data and intervening data to be transmitted at the average bit rate; thus, a significant latency results from the databursts 21 unless the available bandwidth is sufficiently high. Even when the available bandwidth is sufficient to accommodate the data burst bandwidth, then the databursts contribute to a latency of the video transmission since the data is still transmitted serially via a network interface. As was discussed supra, each I-frame contains data for the entire frame, and each P-frame contains data that has changed for the entire frame.

Despite some drawbacks, prior art video encoding techniques are quite suitable for a number of applications. In particular, encoding video in this manner is done for broadcast video applications, video on demand applications and DVD video storage applications, to name just a few examples. In such applications the encoding is performed ahead of time such that processing requirements are not a significant limiting factor. Furthermore, in transmission applications the video data is buffered prior to playback so as to alleviate the problems that are related to high peak data bursts onto the network. It is well known in the art that buffering of data will compensate for any effects of data bursts and the network in dedicated transmission based systems such as broadcast or DVD. Much has been done to evaluate buffering and buffer sizes for use in IP networks. In each of these, video data flows in a single direction from a source to a destination. These strategies are effective for non-interactive applications, but, unfortunately, are not suitable for real-time video conferencing applications.

Figure 3:
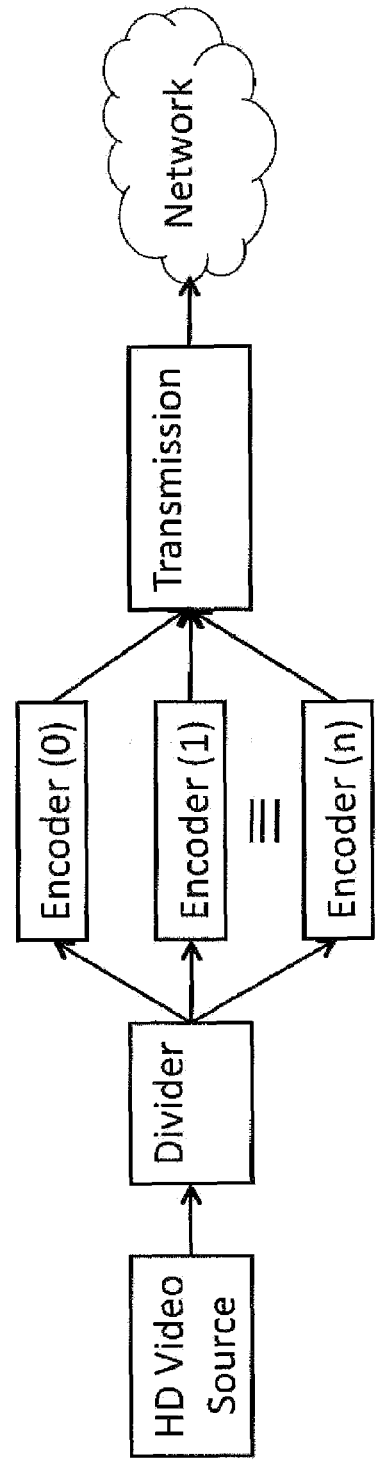
FIG. 3 is a simplified flow diagram showing video encoding according to an embodiment of the instant invention.

Referring now to FIG. 3, shown is a simplified flow diagram for video encoding according to an embodiment of the instant invention. Raw high-resolution video signal is provided from a HD video source to a divider. The divider then divides each frame of the video signal into a plurality of segments. Each segment is encoded independently using a separate encoder, optionally in execution on separate CPUs. The encoded video data for each region is provided to a transmitter, and subsequently transmitted via the network.

For example, raw high resolution video signal is divided into a plurality of segments, in the form of 12 rectangular segments—4 horizontal bands and 3 vertical columns, each of which is processed, compressed and transmitted independently to the receiving end. At the receiving end, each segment is decoded and the decoded segments are recombined to reproduce an image approximating the original signal. Encoding the different segments in parallel reduces latency, for instance approximately 50 ms is required for encoding compared to 100s of ms. Further, encoding the segments independently reduces data burst onto the network.

By way of an illustrative example, if an encoder A requires X milliseconds to encode a full High Resolution frame, then N segments are finished encoding in approximately (X/N) milliseconds, thereby reducing latency by a factor on the order of N. Additionally, since each segment is encoded separately, the I-frame occurrence of each segment is preferably offset from other segments, such that each segment's I-frame occurs when at least another segment produces a P-frame, thereby reducing the overall peak to average data burst onto the network and likely reducing the packet loss. This is shown diagrammatically in FIG. 4, where the I-frames for segment (0), segment (1) and segment (2) are offset one from another.

Figure 4:
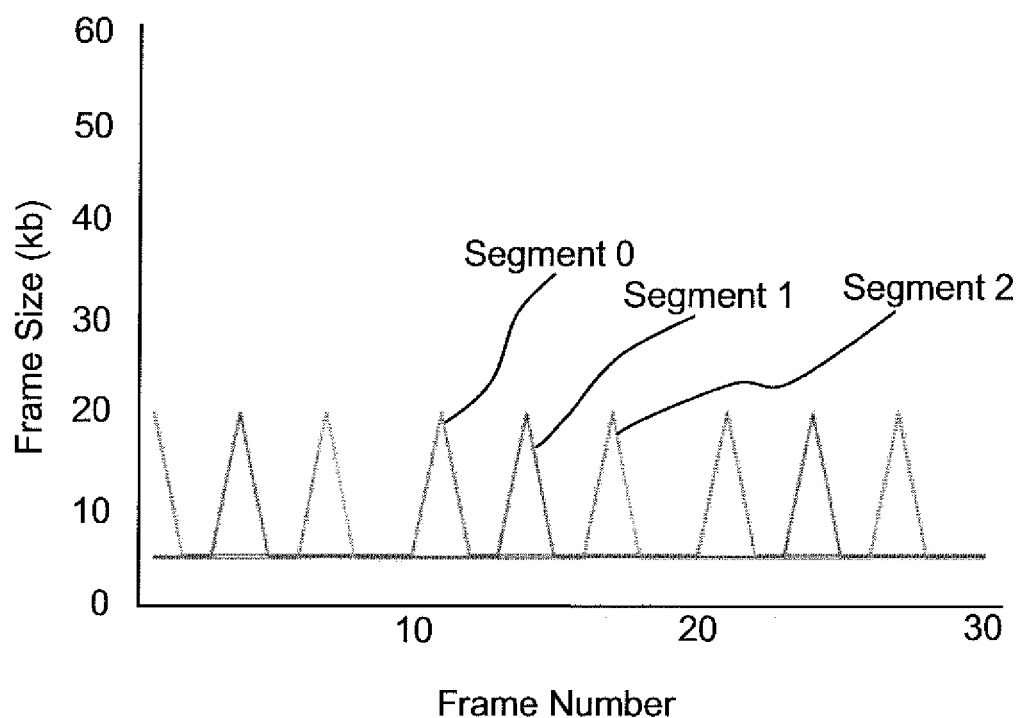
FIG. 4 is a plot showing frame size vs. frame number for video encoding according to an embodiment of the instant invention; and, FIGS. 5a-d illustrate diagrammatically four variations on dividing a frame into segments.

Each signal shown in FIG. 4 has a P-frame size of approximately 5 kB and an I-frame size of approximately 20 kB. Thus, for the three segment example shown, 10 kB of P-frame data is transmitted for each frame and 20 kB of I-frame data is transmitted for a same frame resulting in 30 kB of frame data. This is shown in FIG. 2 at 24. As is seen from FIG. 2, the burst data bit rate is significantly reduced over the prior art while maintaining a similar average data rate and a similar video transmission encoding quality. Of course, using more segments allows for further increased data bit rate averaging until a number of segments is selected such that encoding efficiency is greatly reduced affecting the data rate.

Further optionally, each segment's encoded target bit rate is set independently so segments deemed more important by application can be assigned higher bit rates.

Figure 5:
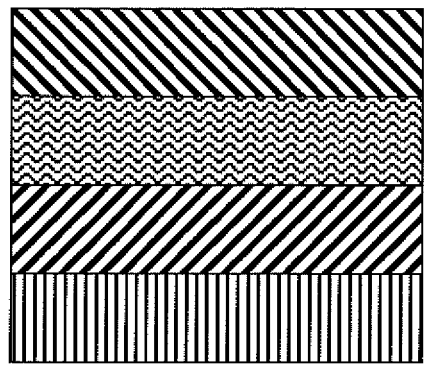
Figure 5:
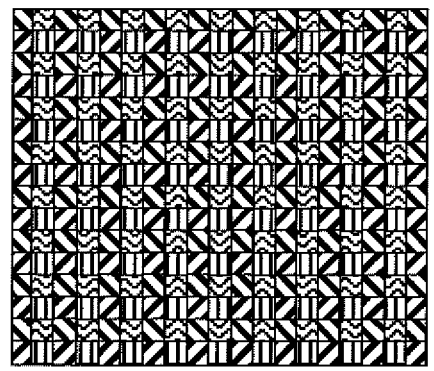
Figure 5:
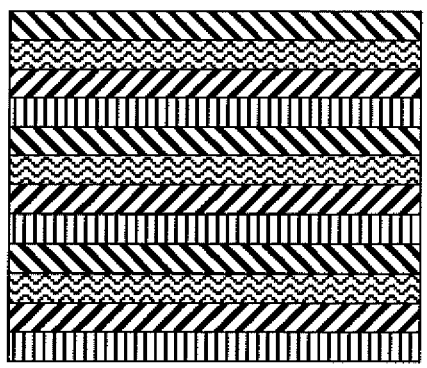
Figure 5:
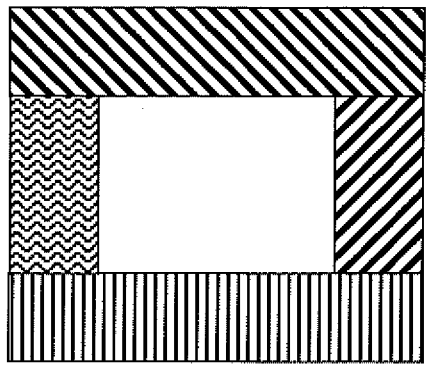

Referring now to FIG. 5, division of a High Resolution frame into independently encoded segments optionally takes many forms. A straightforward approach is to segment each image into a series of rectangular segments aligned in rows and columns within each original image. Using this approach, it is relatively straightforward to provide a number of segments either small or large. Four possible other approaches are shown by way of specific and non-limiting examples.

In FIG. 5a the frame is divided into a plurality of horizontal bands. FIG. 5a shows each band as a different segment, and each segment being of a same size. Optionally, two or more contiguous or non-contiguous bands combine to form a single segment. Further optionally, some of the segments are of different size.

In FIG. 5b each segment is a down sample representation of the image by factor of 4. Of course, optionally another down sampling factor is used.

In FIG. 5c the frame is divided into even and odd lines where one segment consists of all even lines and another segment consists of all odd lines.

In FIG. 5d the frame is divided into windows of flexible size. In the specific and non-limiting example that is illustrated, the frame is divided into upper and lower horizontal bands of equal size, left and right vertical bands of equal size extending between the horizontal bands, and a central rectangular window.

Optionally, the frame division process is a combination of the methods described with reference to FIGS. 5a-d.

The methods and systems according to embodiments of the instant invention, as described above, exploit the fact that videoconference video images typically are relatively static as a whole. For instance, panning and/or rapid scene changes are rare occurrences in videoconferencing applications. For this reason, the background portion of the frame is approximately constant. This information is very useful to a video encoder that is specialized for videoconferencing applications. In particular, it is known in advance that large areas of each frame are likely or even very likely to be the same as in the previous frame. Thus, the video encoder does not need to determine this fact in an analytical manner for each and every frame, at a rate of 24 to 60 frames per second. Rather, it is necessary only for the video encoder to process the image to determine the regions of movement. Optionally, the rate at which I-frames are sent out is reduced relative to that of general purpose video encoding. This is because, unlike movies and broadcast television, there is a low probability in videoconferencing that the video signal will include a scene change, panning motion, or other type of change that requires a new I-frame to be sent.

In addition, dividing the frame into a plurality of segments takes advantage of the knowledge that large areas of each frame are likely or even very likely to be the same as in the previous frame. In particular, each segment is encoded independently of each other segment. If for a particular segment it is determined that the change relative to the same segment of the previous frame exceeds a threshold value, then an I-frame for that segment only is sent. Some or all of the other segments of the same frame may require only a P-frame. In fact, those frames that are outside of a region that is occupied by a videoconference participant may require I-frames only at very long intervals, whilst those segments that contain a portion of the face of the participant require more frequent I-frames. Overall, this approach tends to reduce both the burst and average data traffic onto the network and reduces latency, since I-frames are sent only for individual segments rather than for the entire frame, and the I-frames for different segments are offset and/or sent at different intervals of time.

In a simple application the segments are defined as geometric shapes such as rectangles or squares. Optionally, the segments are defined based upon knowledge that is provided for, or determined on the basis of usage of, a particular videoconferencing or telepresence system. For instance, if it is expected that a single participant will be seated centrally within the video frame then an acceptable strategy for dividing the frame may be the one that is illustrated in FIG. 5*d*, wherein the central rectangle is located over the portion of the frame that contains the participants face. Thus, the horizontal and vertical segments define portions of the frame that are expected to contain less motion. The central rectangle can further be assigned to an encoder with a high bitrate, whist the remaining segments are allotted lower bitrates. Alternatively, the central rectangle may be encoded using one processor of a dual core processor and the other processor of the dual core processor may encode all of the remaining segments. Optionally, some of the segments are not processed every frame.

The segments are optionally irregular and/or non-contiguous. Further optionally, the segments are determined dynamically and change throughout the course of one or more videoconference sessions.

Numerous other embodiments may be envisaged without departing from the spirit or scope of the invention.

What is claimed is:

1. A method of encoding in real time a video signal that is associated with a videoconference or telepresence session, the method comprising:
   capturing a stream of video data comprising a series of sequential video frames;
   separating the video frames into a plurality of frame segments, wherein each frame segment represents a part of a complete video frame;
   encoding each frame segment independently and in parallel to generate parallel encoded data streams, one for each of the plurality of frame segments, each encoded data stream containing a sequence of frame segment instances each corresponding to a particular frame segment in the video frames, and each encoded data stream containing I-frame segment instances that carry complete information about a particular frame segment and P-frame segment instances that carry partial information about the particular frame segment, the partial information representing information that has changed relative to a previous frame segment instance in that encoded data stream, and wherein the encoding of the frame segments for each frame is performed such that when an instance of one of the frame segments within a particular frame is an I-frame segment instance, at least one of the other frame segment instances in that particular frame is a P-frame segment instance, whereby in the respective parallel encoded data streams in any period of time when an I-frame segment instance is present in one of the parallel encoded data streams, a P-frame segment instance is present in at least one of the other parallel encoded data streams;
   transmitting the parallel encoded data streams independently over a network to a receiver to permit the receiver to decode each frame segment and recombine the decoded frame segments from the different encoded data streams to reproduce an image;
   wherein during transmission of I-frame segment instances of one of the frame segments, P-frame segment instances of all other frame segments are transmitted.

2. A method according to claim 1, wherein the frame segments correspond to predetermined parts of the video frames.

3. A method according to claim 1, wherein each frame segment corresponds to a different predetermined area of the video frames.

4. A method according to claim 1, wherein the frame segments are uniformly sized geometric shapes.

5. A method according to claim 1, wherein at least one of frame segment size and shape is different for one of the frame segments compared to another of the frame segments.

6. A method according to claim 1, wherein at least one of the frame segments comprises a plurality of predetermined non-contiguous areas of the video frames.

7. A method according to claim 1, wherein the frame segments are determined in dependence upon external application data and indicative of the amount of motion that is expected in different areas of the video frames.

8. A method according to claim 1, wherein the frame segments are determined in dependence upon external prior use data indicative of the amount of motion previously determined in different areas of the video frames.

9. A method according to claim 1, wherein a period between regularly spaced I-frame segment instances for one of the frame segments is different than a period between regularly spaced I-frame segment instances for another of the frame segments.

10. A method according to claim 1, wherein the frame segments are encoded in encoders having different encoding characteristics.

11. A method according to claim 10, wherein at least one of the encoders has a bitrate that is greater than a bitrate of the other encoders.

12. A video encoding system for encoding in real time a video signal that is associated with one of a videoconference and a telepresence session, the system comprising:
    a port for receiving a stream of video data comprising a series of sequential video frames;
    a divider for dividing the stream of video data into a series of substreams of data corresponding to frame segments, wherein each frame segment represents a part of a complete video frame;

a plurality of video encoders arranged in parallel for independently encoding the respective frame segments to generate parallel encoded data streams, one for each of the plurality of frame segments, each encoded data stream containing I-frame segment instances that carry complete information about a particular frame segment and P-frame segment instances that carry partial information about a particular frame segment, the partial information representing information that has changed relative to a previous frame segment instance in that encoded data stream, and the video encoders being arranged to encode each frame segment such that when an instance of one of the frame segments within a particular frame is an I-frame segment instance, at least one of the other frame segment instances in that particular frame is a P-frame segment instance, whereby in the respective parallel encoded data streams in any period of time when an I-frame segment instance is present in one of the parallel encoded data streams, a P-frame segment instance is present in at least one of the other parallel encoded data streams; and a transceiver for transmitting the parallel encoded data streams independently over a network to a receiver to permit the receiver to decode each frame segment and recombine the decoded frame segments to reproduce an image;

wherein during transmission of I-frame segment instances of one of the frame segments, P-frame segment instances of all other frame segments are transmitted.

13. A video encoding system according to claim 12 comprising: a memory for storing predetermined data defining the frame segments, which correspond to predetermined parts of the video frames.

* * * * *